April 24, 1951 G. W. ALLAN 2,550,133
BOOKKEEPING MACHINE
Filed June 11, 1945 14 Sheets-Sheet 1
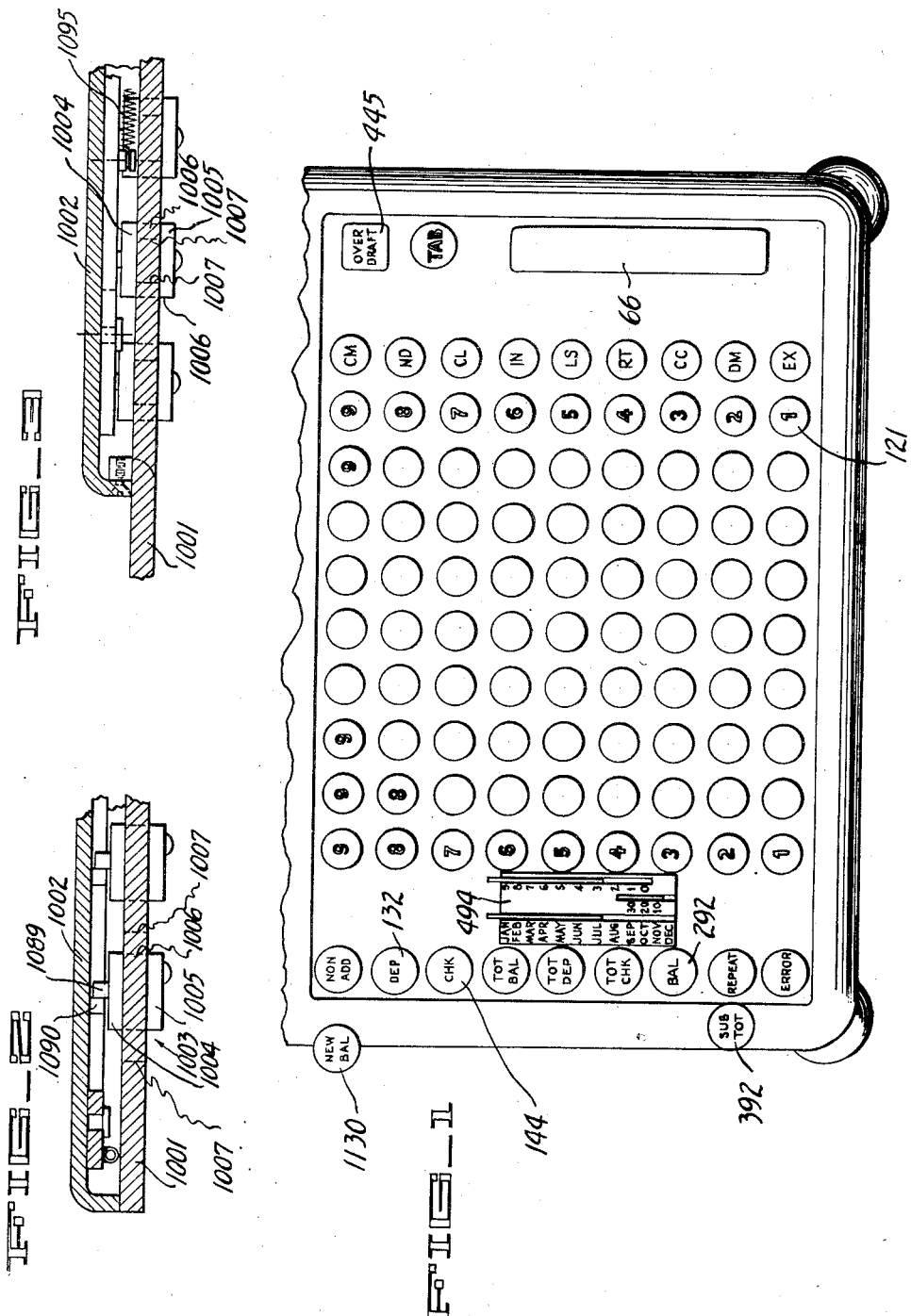
*INVENTOR*
George W. Allan
BY
*ATTORNEY*

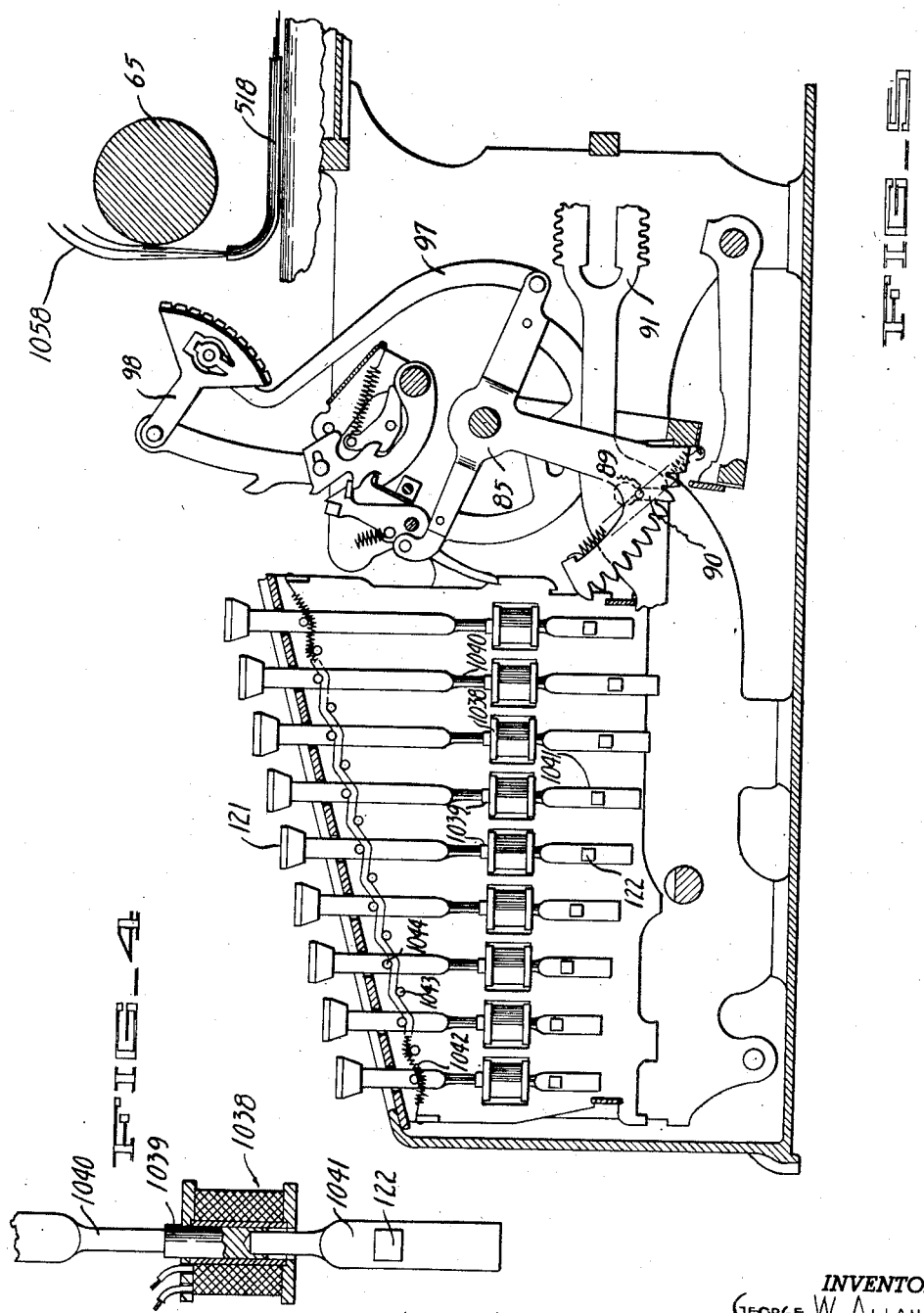

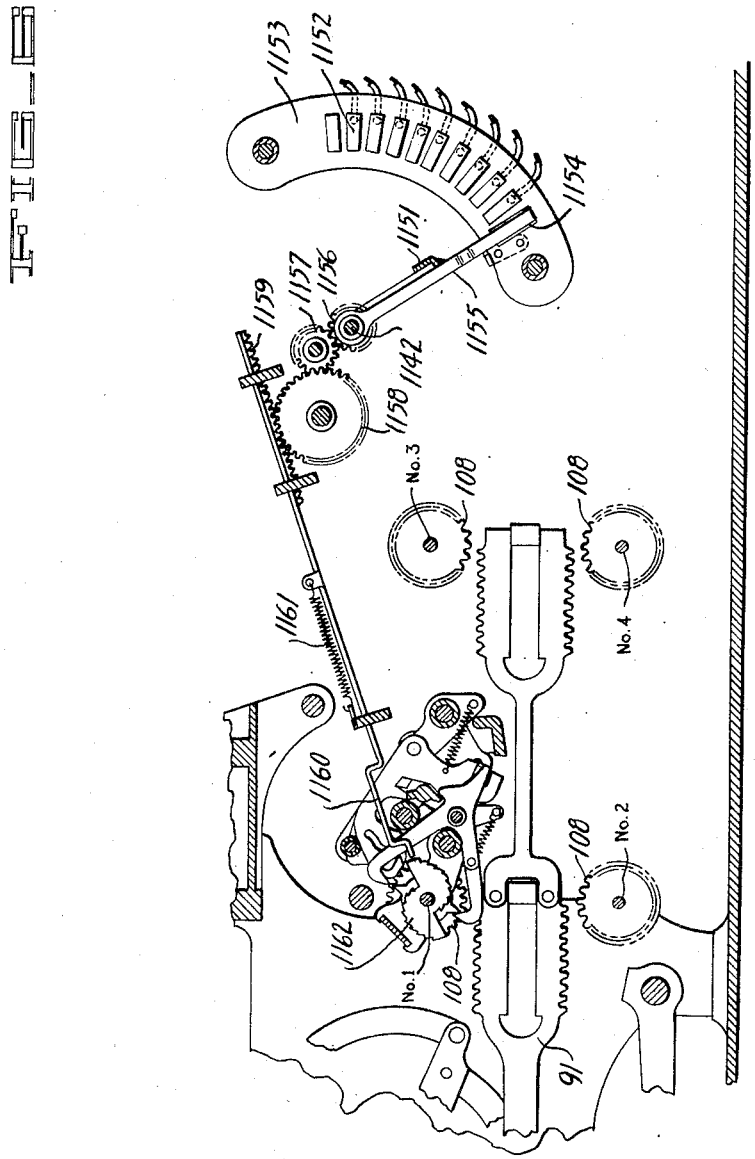

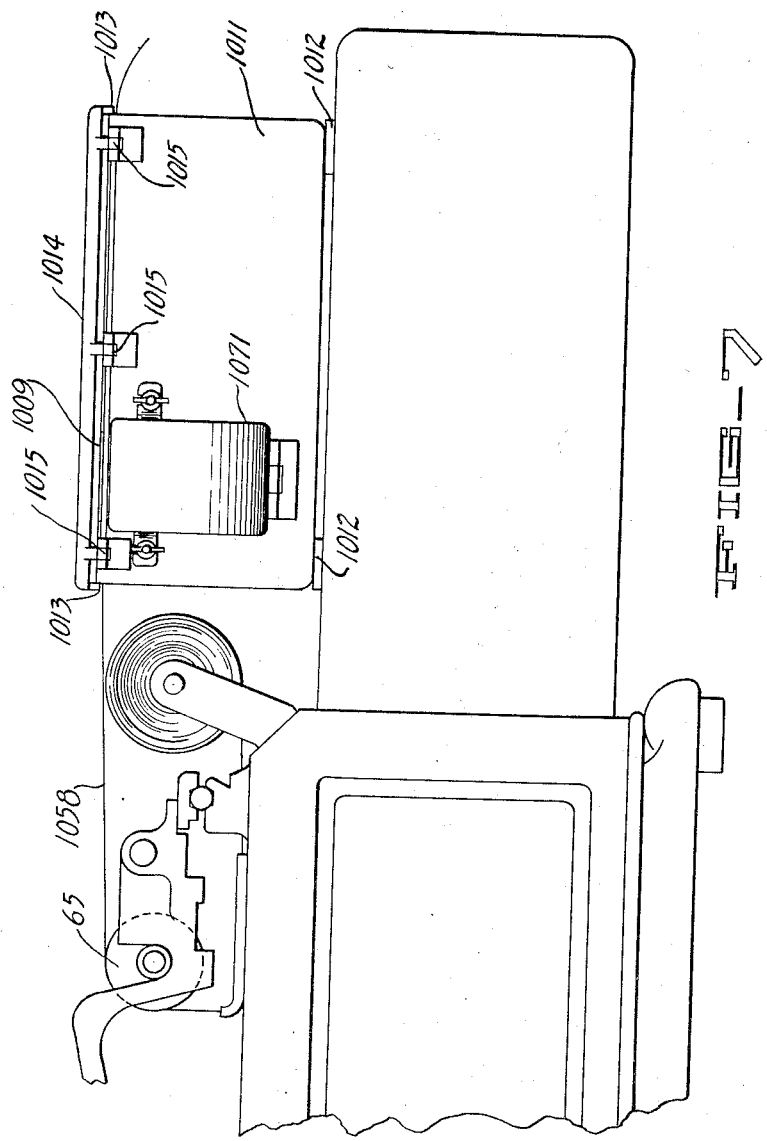

April 24, 1951 G. W. ALLAN 2,550,133
BOOKKEEPING MACHINE
Filed June 11, 1945 14 Sheets-Sheet 5
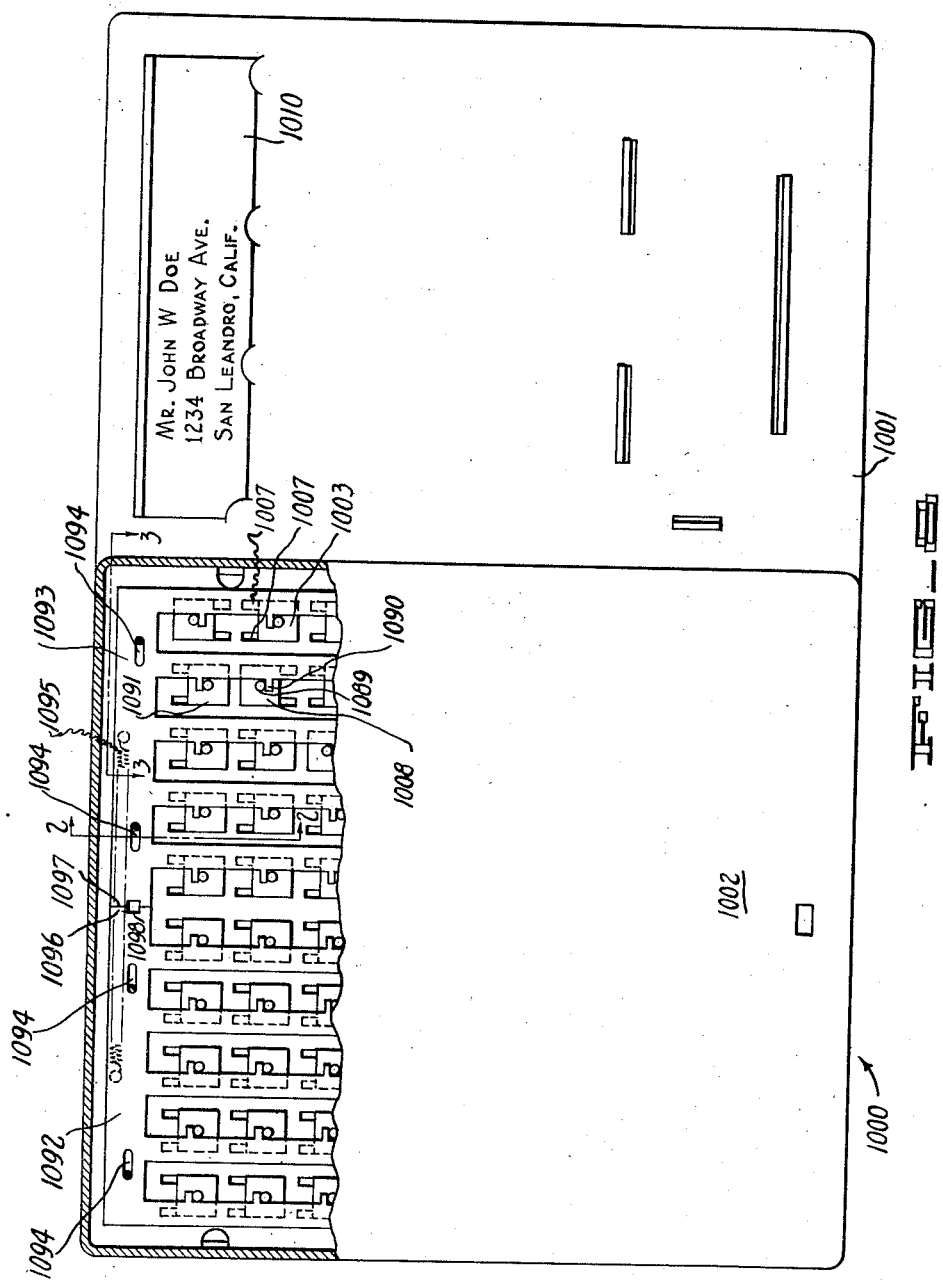
INVENTOR
GEORGE W. ALLAN
BY
ATTORNEY April 24, 1951
G. W. ALLAN
2,550,133
BOOKKEEPING MACHINE
Filed June 11, 1945
14 Sheets-Sheet 6
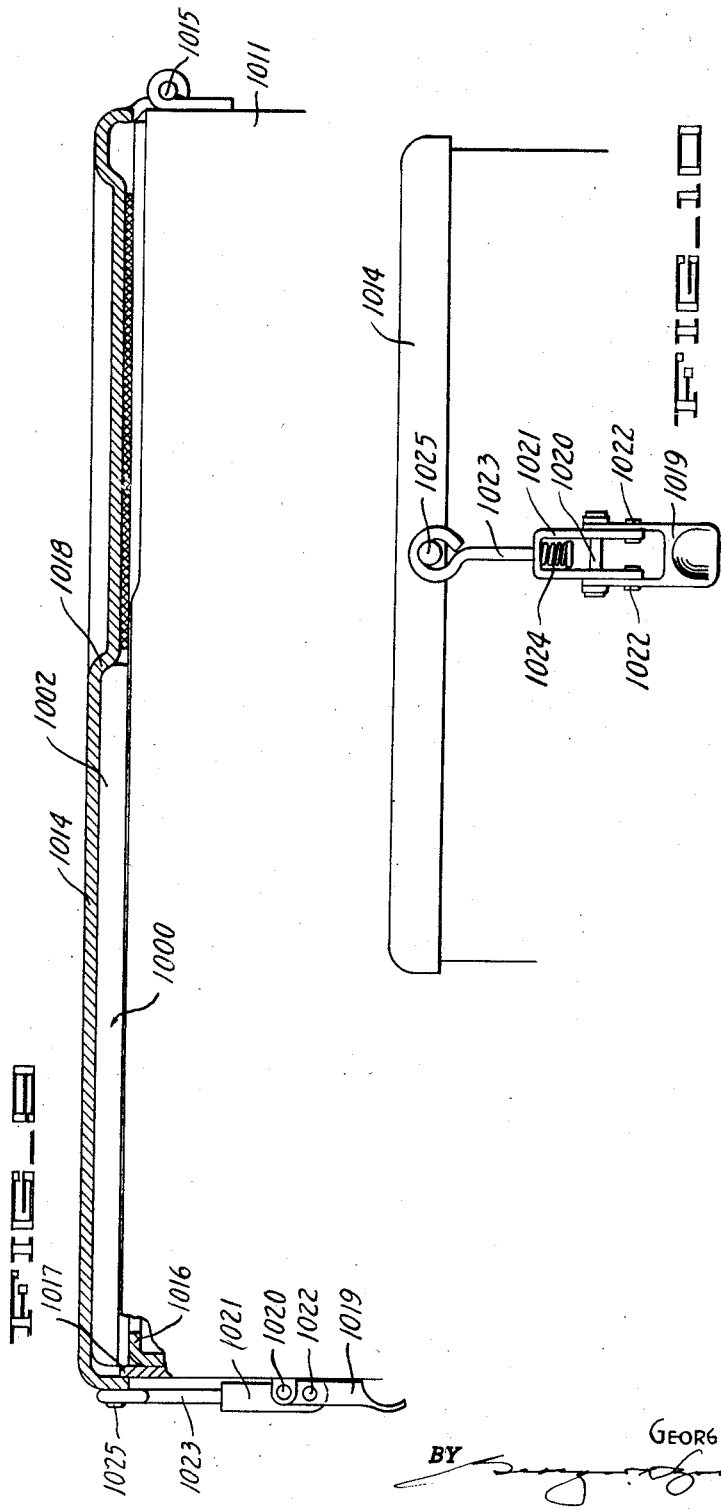
INVENTOR
GEORGE W. ALLAN
BY
ATTORNEY

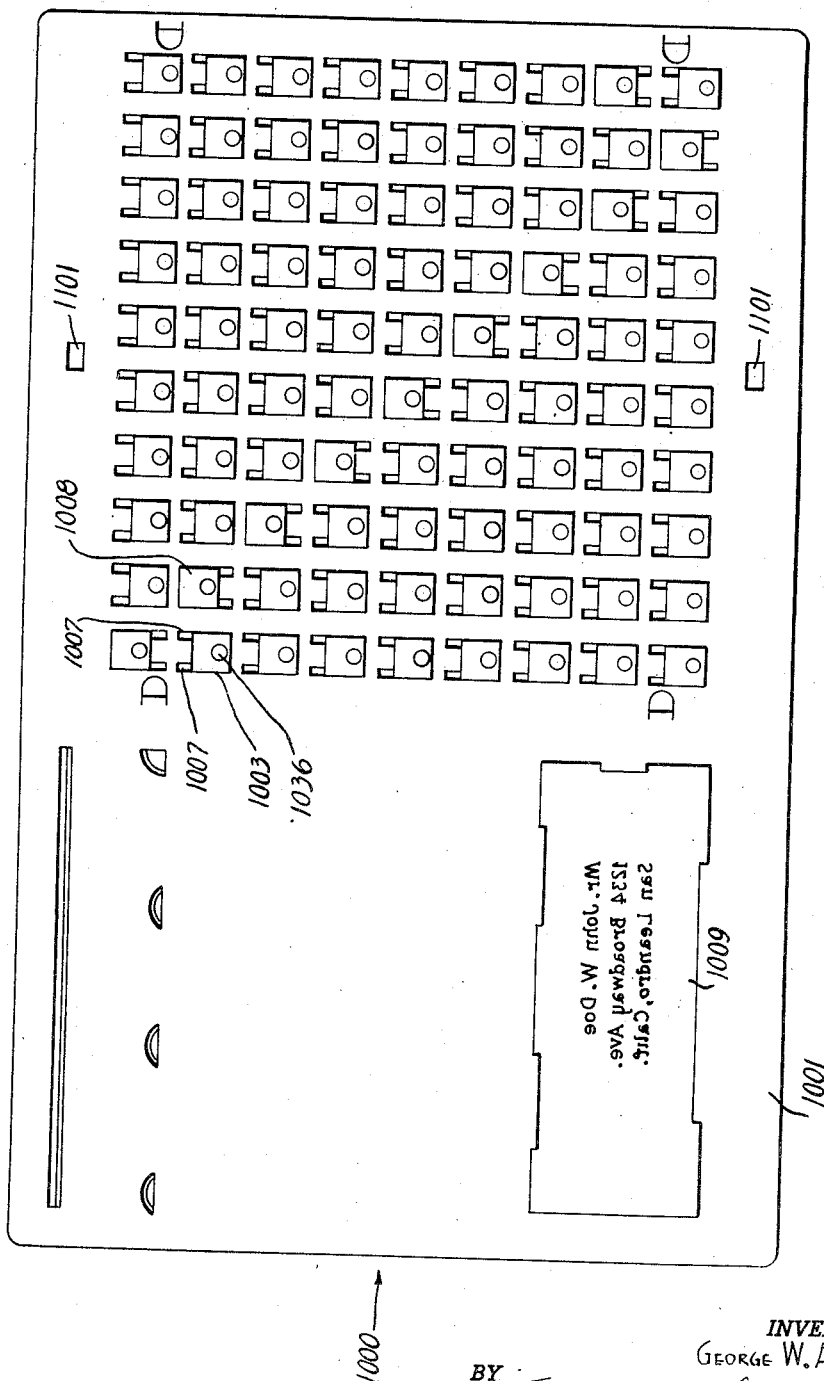

April 24, 1951 G. W. ALLAN 2,550,133
BOOKKEEPING MACHINE
Filed June 11, 1945 14 Sheets-Sheet 8
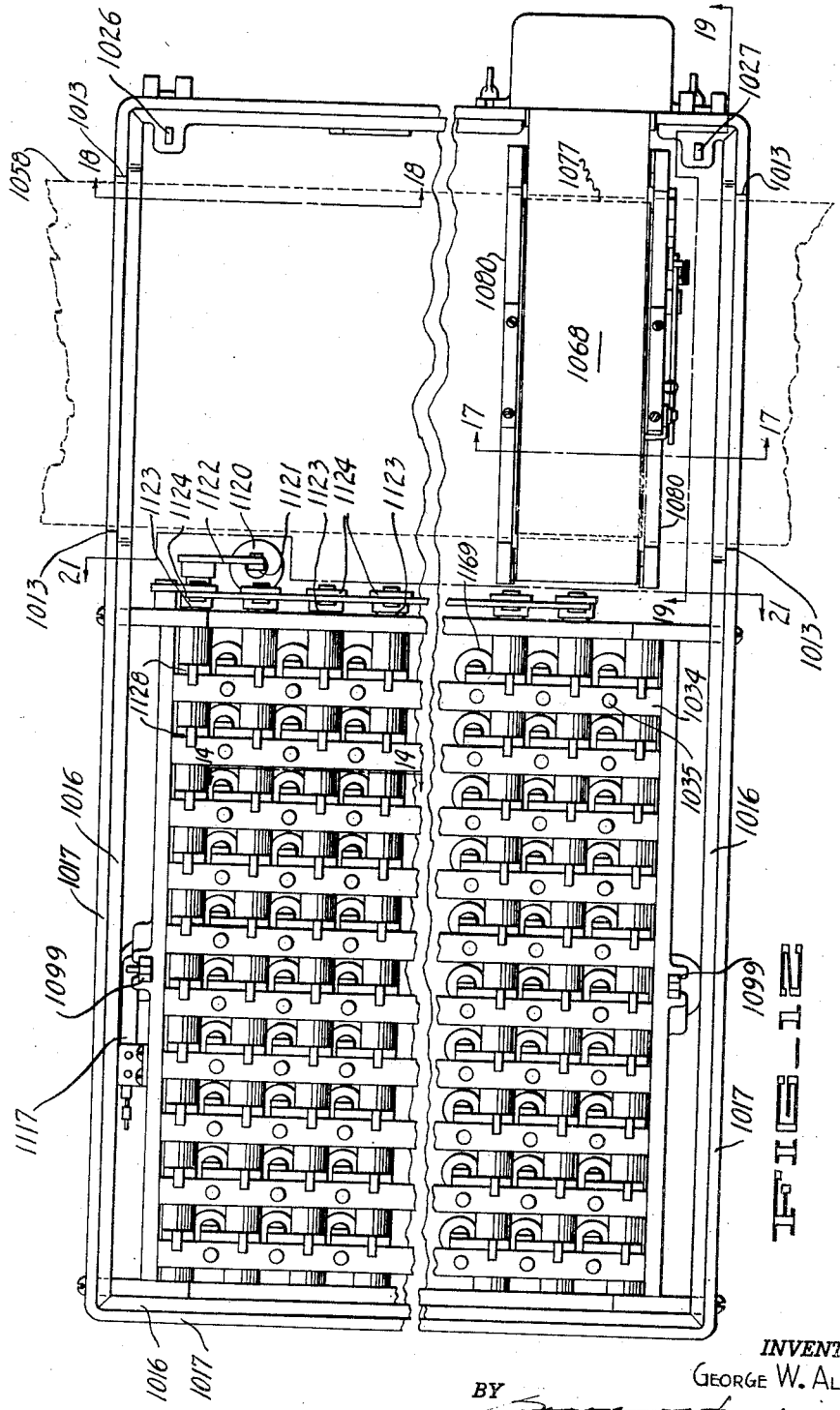
INVENTOR
GEORGE W. ALLAN
BY
ATTORNEY April 24, 1951     G. W. ALLAN     2,550,133
BOOKKEEPING MACHINE
Filed June 11, 1945     14 Sheets-Sheet 9
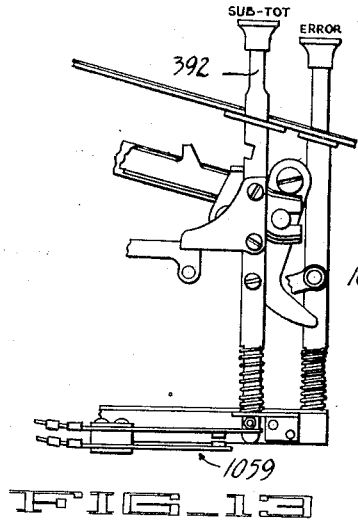
FIG_13
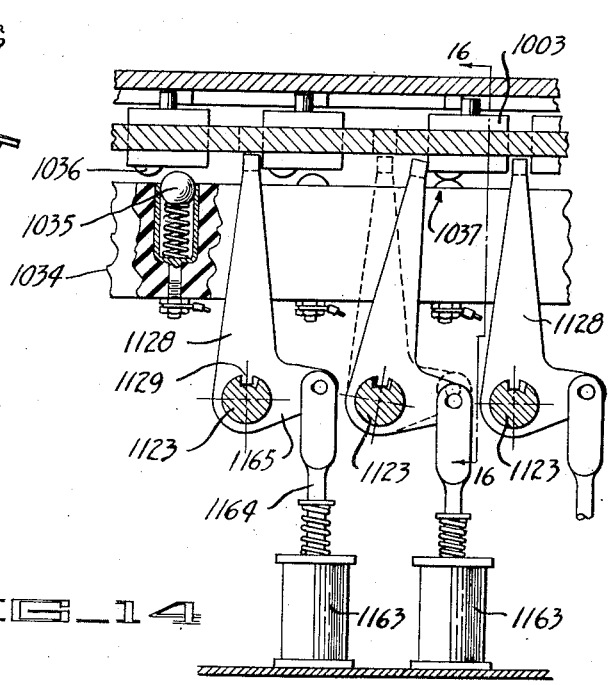
FIG_14
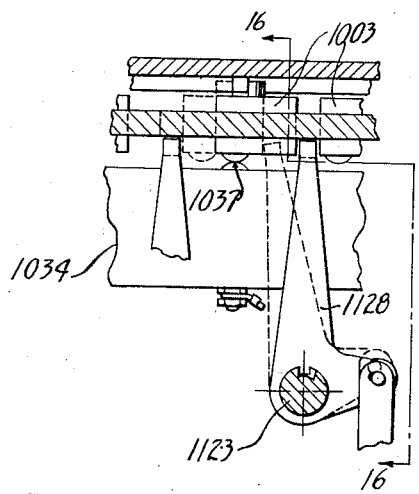
FIG_15
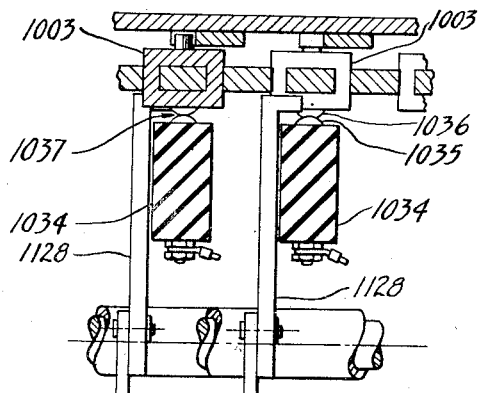
FIG_16
INVENTOR
GEORGE W. ALLAN
BY
ATTORNEY April 24, 1951 G. W. ALLAN 2,550,133
BOOKKEEPING MACHINE
Filed June 11, 1945 14 Sheets-Sheet 10
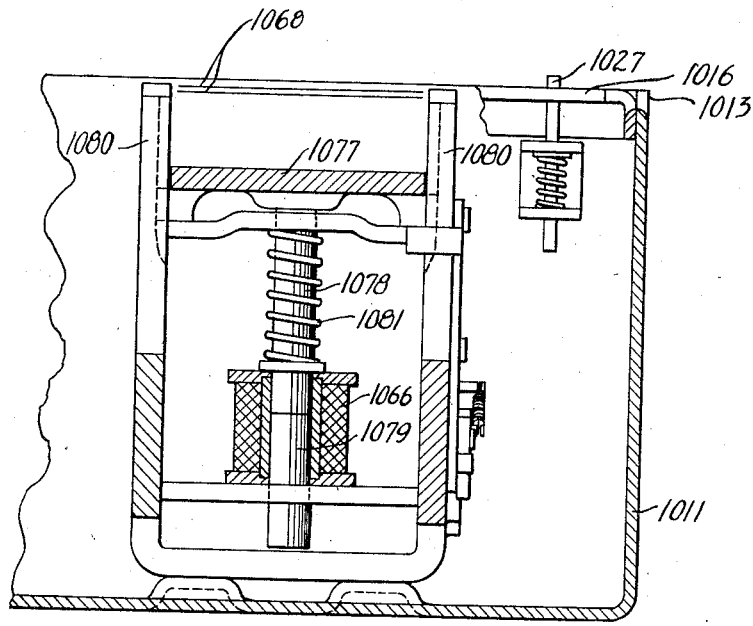
FIG_17
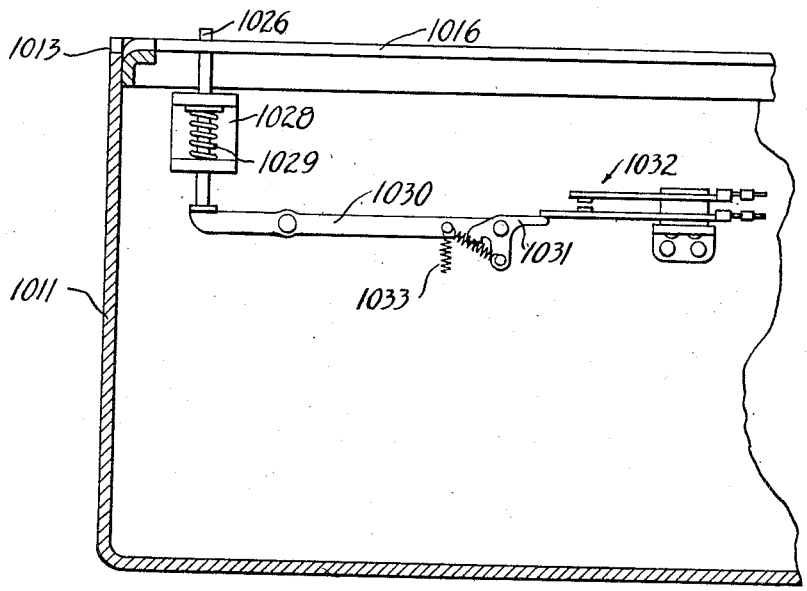
FIG_18
INVENTOR
GEORGE W. ALLAN
BY
ATTORNEY

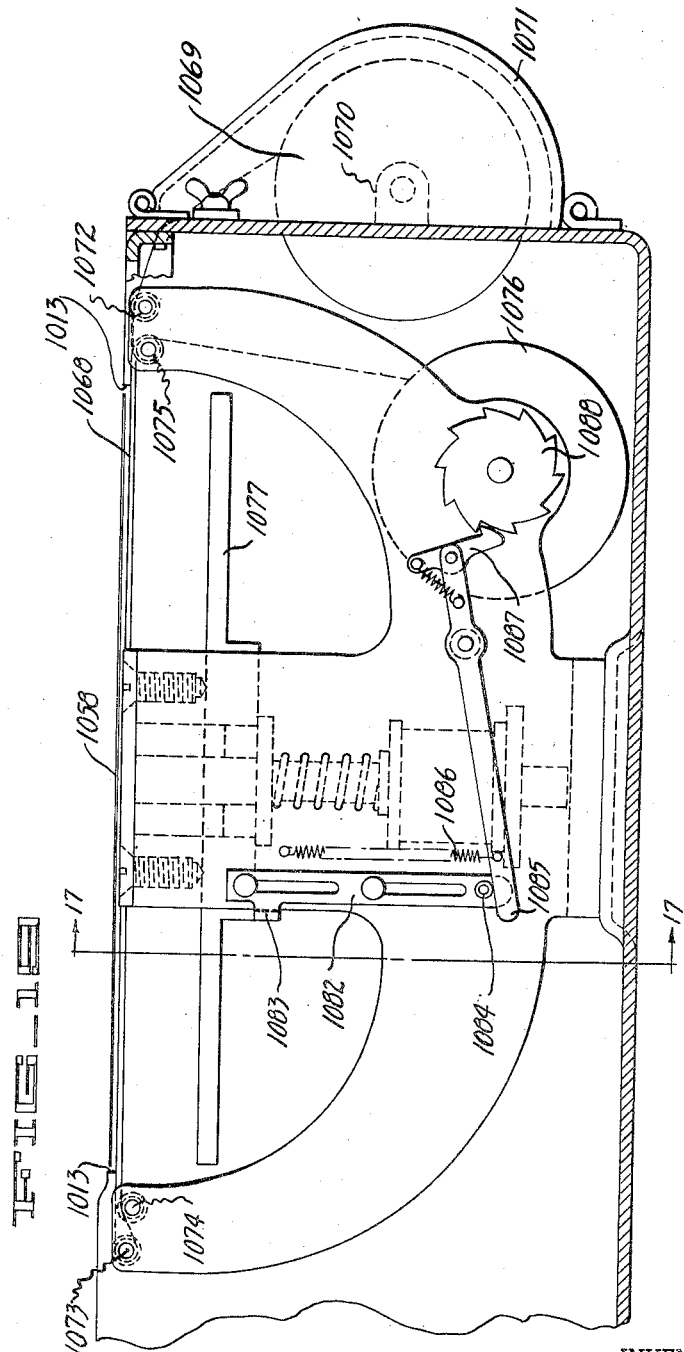

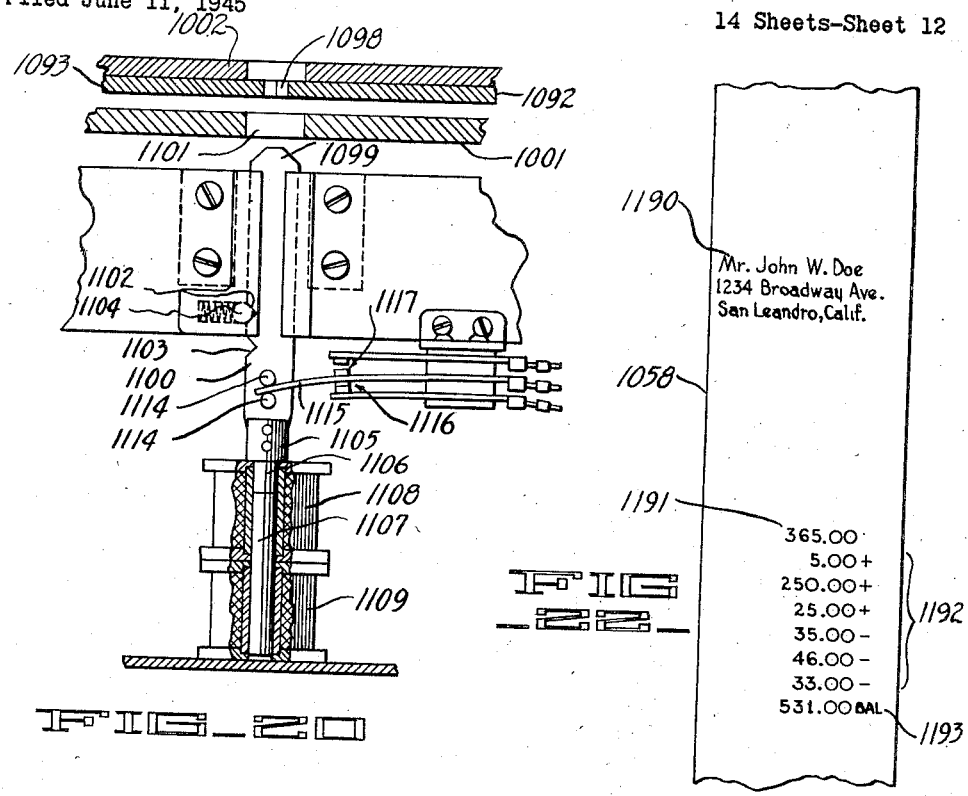
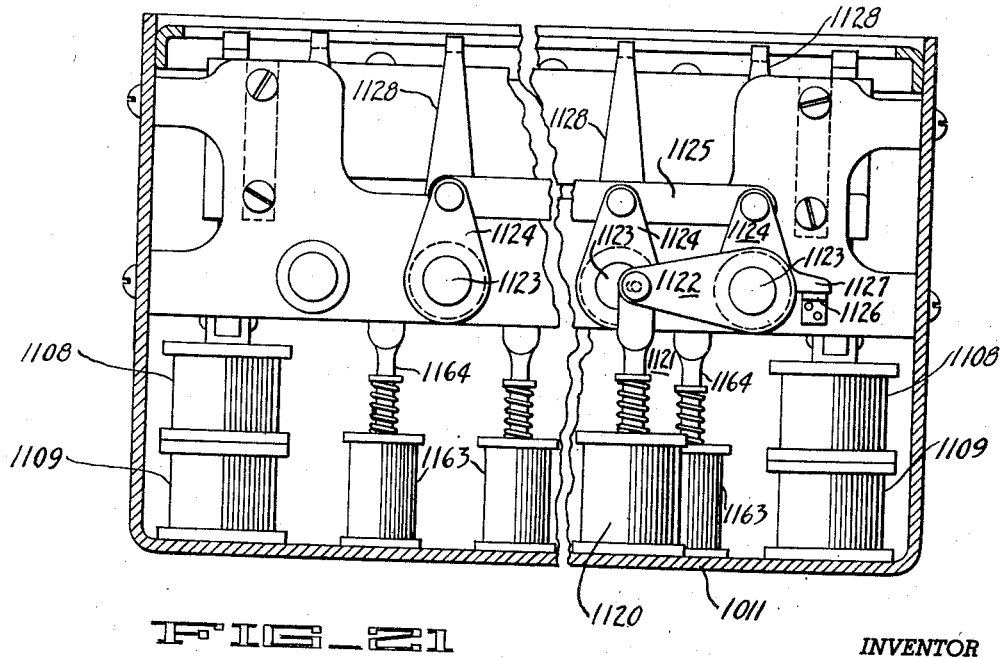

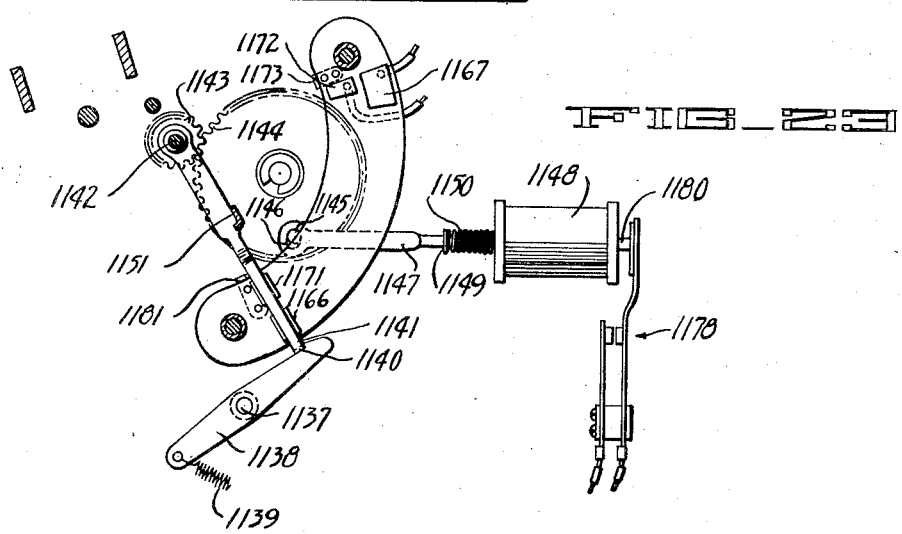
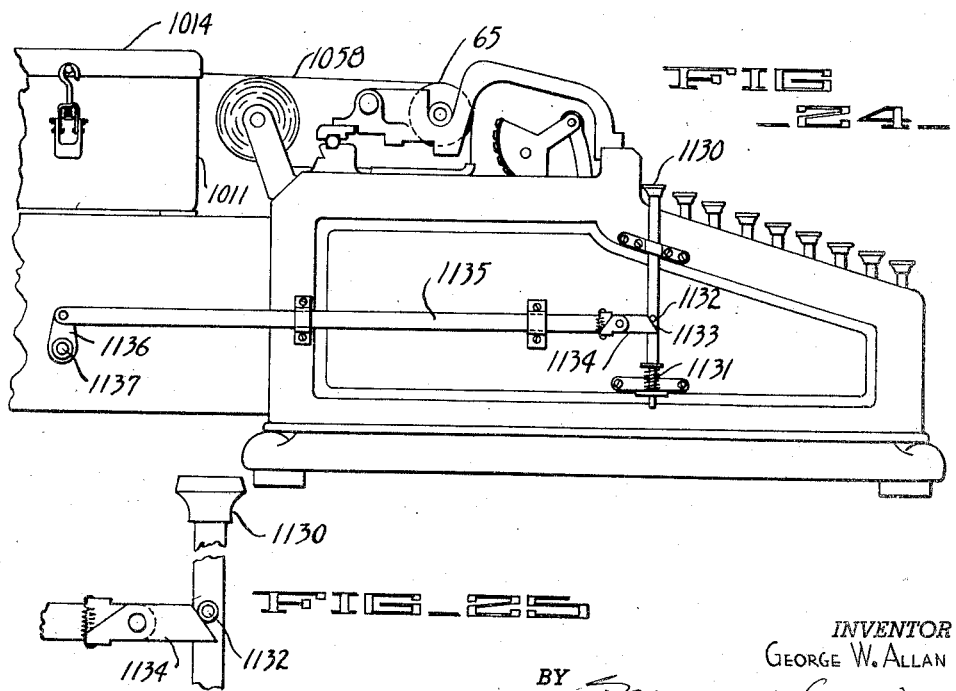

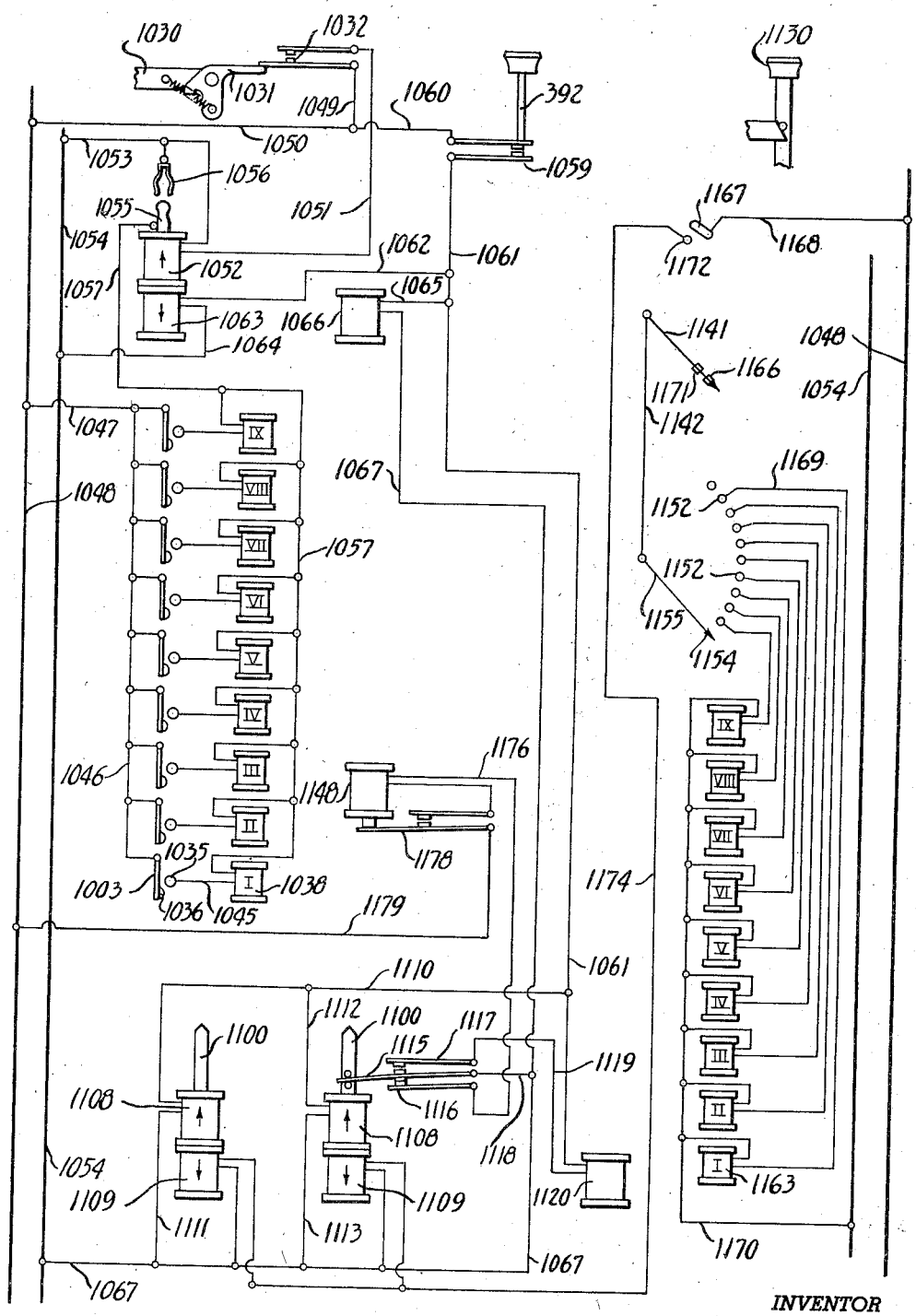

Patented Apr. 24, 1951

2,550,133

UNITED STATES PATENT OFFICE 2,550,133

BOOKKEEPING MACHINE

George W. Allan, San Lorenzo, Calif.

Application June 11, 1945, Serial No. 598,753

25 Claims. (Cl. 235—6)

This invention relates to calculating machines of all types including accounting machines and adding machines, and this application is a continuation in part of my co-pending application Serial No. 451,813 filed July 21, 1942, now abandoned, for Control Plate and Control Means for Bookkeeping Machine.

The object of the invention is to provide a means for cooperation with a calculating machine which will enable a total figure to be taken from a totalizer in the machine and stored in a device which can then be removed from the machine and which, at any subsequent time, can be returned to the machine and the total stored therein transferred to the machine.

Another object is to combine with said total-storing device characters for printing an identification of the calculation performed when the device is in the machine so that the printed record produced by the machine will include the identifying characters, such as a name and address, together with the figure transferred from the storing device to the machine, such as an old balance, the figures entering into the calculation, and the new balance which is set in the storing device.

My invention is widely applicable to different types of calculating machines and is useful in many different fields. However, for purposes of illustration, I have disclosed my invention as embodied in a device particularly useful in bank accounting, and I have chosen as the machine to which my mechanism is to be applied the bank accounting machine disclosed in the patent to Christian No. 2,038,717, issued April 28, 1936. I desire to have the disclosure of that patent, as well as all of the patents referred to therein, particularly the patent to Ellis No. 1,203,863, issued November 7, 1916, to be considered as part of this disclosure and, for details of the accounting machine itself, reference is to be had to said patents. In the following disclosure only those parts which are immediately associated with the mechanism which, in accordance with my invention I add to the machine disclosed in said patents, will be illustrated in the drawings.

In the drawings:

Figure 1 is a plan view of the keyboard of the machine corresponding to Figure 1 of said Christian patent.

Figures 2, 3 and 4 are details.

Figures 5 and 6 taken together comprise a vertical longitudinal section through the machine and correspond to Figure 3 of said Christian patent. A transfer mechanism for the totalizer shown in Figure 6 is shown in said Ellis patent.

Figure 7 is a right side elevation of the rear portion of the machine.

Figure 8 is a plan view of one of the storing devices.

Figure 9 is a fragmentary vertical transverse section through the case and its lid.

Figure 10 is a detail of the fastening device for the lid.

Figure 11 is a bottom view of the device shown in Figure 8.

Figure 12 is a plan view of the case and the mechanism therein with the lid removed.

Figure 13 is a detail of the switch associated with the sub-total key.

Figure 14 is a fragmentary vertical longitudinal section taken as indicated by the line 14—14 in Figure 12 with one of the storing devices in place.

Figure 15 is a view similar to Figure 14 with the parts in a different position.

Figure 16 is a fragmentary section taken as shown by the line 16—16 in Figure 14.

Figure 17 is a section through the printing device taken as indicated by the line 17—17 in Figure 12.

Figure 18 is a fragmentary section showing a switch and operating devices therefor taken as indicated by the line 18—18 in Figure 12.

Figure 19 is another view of the printing device taken as indicated by the line 19—19 in Figure 12.

Figure 20 is a view of a lock operating device.

Figure 21 is a vertical transverse section through the case with parts broken away, the plane of the section being indicated by the line 21—21 in Figure 12.

Figure 22 is an example of the record produced by the machine of the invention.

Figure 23 is a detail of the operating means for the bail which controls the selecting arms.

Figure 24 is an elevation of the left side of the machine.

Figure 25 is a detail.

Figure 26 is a wiring diagram.

OPERATION OF THE MACHINE OF THE CHRISTIAN PATENT

In the following disclosure when reference is made to parts found in the machine of said Christian patent, the same reference numeral will be employed as that applied to the part in the patent. Figures referred to are figures in the drawings of this disclosure unless otherwise stated. Referring to Figure 1, the keyboard of the machine comprises a plurality of keys 121, each of which is provided with a pin 122 (Figures 4 and 5) which in the depressed position of the key serves as a stop for controlling the rearward movement of the rack 91 by means shown in Figure 3 of the above-cited patent to Christian, which rack has a pin and slot connection 89, 90 with an arm 85 which is connected through a link 97 with the type actuator 98. The paper tapes are conducted by a guide 513 to pass over a platen 65. One of the characteristics of said Christian patent is that old balances, checks, deposits, and new balances can be printed in a vertical column on a paper tape which is fed vertically. An example of the record which can be produced by this machine is shown in Figures 42 and 46 of said Christian patent.

As disclosed in said Christian patent, the rack 91 (Fig. 6) has cooperating therewith four totalizers 103 which are numbered "1" to "4." By means of the racks 91 values set in the keyboard can be entered into the No. 1 totalizer additively or subtractively depending on whether the entry is a debit or a credit. The No. 2 totalizer accumulates new balances, the No. 3 totalizer accumulates the total amount of checks, and the No. 4 totalizer accumulates the total amount of deposits.

As explained in said Christian patent, at the beginning of the day the operator sets the date in the device 494 (Fig. 1) so that this date will be printed on the record. In posting an individual account the bookkeeper looks up the old balance which he sets in the keyboard 121 and then depresses the sub-total key 392 and the motor bar 66. This causes the old balance to be additively registered in the No. 1 totalizer only; this figure is not registered in the other three totalizers. The operator then posts the checks by setting the amount of the check in the keyboard 121, depressing the check key 144 and the motor bar 66. This causes the amount of the check to be subtracted from the No. 1 totalizer and added in the No. 3 totalizer. He posts the deposits by entering the amount in the keyboard 121, depressing the deposit key 132 and the motor bar 66. This causes the amount of the deposit to be additively registered in the No. 1 totalizer and in the No. 4 totalizer. After posting the checks and deposits of the individual account, the operator depresses the balance key 292 and the motor bar 66. This causes the No. 1 totalizer to be cleared and the total standing therein to be printed as the new balance. The amount of the balance is registered in the No. 2 totalizer. In the case of an overdraft the complement of the amount is registered in the No. 1 totalizer and, in order to print the overdraft as a true figure, means are provided which are under the control of the overdraft key 445.

INVENTION IN GENERAL

As will presently appear from the following disclosure, my invention eliminates the use of printed records of the previous balance in each account, reduces the amount of time and work required to post accounts, eliminates the possibility of human error in picking up old balances, and eliminates the possibility of the bookkeeper altering or in any way tampering with the account balance.

In accordance with my invention I provide a mechanical device for each account in which the balance of the account is represented by an adjustable means which is locked when the device is removed from the machine. When an account is to be posted, the storing device containing the balance figure of that account is placed in the machine wherein means is provided for automatically picking up the old balance from the storing device and transferring it to the calculating mechanism of the machine.

Once the old balance has been automatically picked up, the machine of the Christian patent is operated in the usual manner to post the account and, at the conclusion of the posting operation, means is provided for setting the new balance in the storing device. In order to follow the sequence of posting operations described above, I shall first describe one of the storing devices and explain how the total stored therein is automatically picked up by the machine and then show how a new balance is stored in the storing device.

STORING DEVICE

The storing device 1000 (Fig. 8) consists of a metal case comprising the plate 1001 and a cover plate 1002 secured thereto. As shown in Figures 3 and 8, the cover plate extends over a portion of the plate 1001. Means for storing the total is disposed between the plate 1001 and the cover plate 1002 and consists of a plurality of rows of identical slides 1003, only one of which will be described. The slide has rectangular top and bottom parts 1004 and 1005 (Figs. 2 and 3) interconnected by side portions 1006. The sides 1006 are disposed in slots 1007 in the plate 1001. As shown in Figure 8, the slots 1007 are of greater length than the length of the slide 1003 so that the slide is capable of movement from one end of the slots to the other. As will presently appear, when disposed in the forward ends of the slot, the slide does not represent a value. However, when disposed in the rear ends of the slot, as shown by the position of the slide 1008, the slide does represent a value and this particular slide would represent a figure "8" in the second order. As shown in Figure 11, bearing in mind that this is the under side of the storing device, the slides are shown as adjusted to represent the total figure 2123456789.

Means are provided as will presently be described for locking the slides in their adjusted positions, for clearing all the slides to zero, and for adjusting the slides to a new balance.

Mounted on the under side of the plate 1001 (Fig. 11) is a plate 1009 for printing the name and address of the depositor and, for filing purposes, the same name and address appears on a card 1010 (Fig. 8) attached to the top of the storing device.

AUTOMATIC PICK UP OF OLD BALANCE

As shown in Figure 7, the machine of the patent has mounted on the rear end thereof a case 1011 which is insulated therefrom by means of blocks of insulation 1012. The paper tapes 1058, after they leave the platen 65, pass through the case 1011 by way of guides 1013. The case has a lid 1014 connected thereto by means of hinges 1015.

In operation the operator picks up the storing device 1000 belonging to the account which is to be posted and places said storing device in the top of the case 1011 (Fig. 9) which is provided with a ledge 1016 (Figs. 9 and 12), on which the device rests, and a rim 1017 for locating the device in position. The operator then closes the lid 1014 which has a portion 1018 (Fig. 9) which is adapted to engage the edge of the cover 1002 of the storing device 1000 to move it to the left in Figure 9 against the rim 1017. The lid 1014 is then latched down to resiliently hold the storing device 1000 on its seat 1016. For this purpose a latch comprising a yoke 1019 (Figs. 9 and 10), pivoted at 1020 in brackets on the case 1011, has a yoke 1021 which is pivoted thereto at 1022. A hook 1023 is resiliently mounted in the yoke 1021 by means of a spring 1024 and is adapted to be engaged with a pin 1025 on the lid 1014.

To facilitate removal of the storing device 1000 from the case 1011 at the conclusion of the posting operation after the lid 1014 has been raised, there are mounted in the case two spring-pressed ejector pins 1026, 1027 (Fig. 12) which are shown in detail in Figures 17 and 18. The pins are identical and only one will be described in detail. Pin 1026 is slidably mounted in a bracket 1028 and is urged upwardly by the spring 1029. The ejector pin 1026 operates a switch for a purpose later described. When the storing device 1000 is placed in the case 1011 and the lid closed, the pins 1026, 1027 are depressed. The pin 1026 rocks a lever 1030 (Fig. 18) counterclockwise on its pivot and, by means of a pawl 1031, momentarily closes the switch 1032. When the lid is opened the pins 1026, 1027 move upwardly to lift the device 1000 to facilitate removal thereof from the case. When the pin 1026 moves upwardly, the lever 1030 is moved clockwise by a spring 1033 and the pawl 1031 wipes past the switch 1032 without operating it.

Supported within the case 1011 are a plurality of parallel longitudinal bars of insulation 1034 (Figs. 12 and 14). Each bar has mounted therein nine spring-pressed ball contacts 1035. The construction of one of these contacts is shown in detail in Figure 14. Each of the slides 1003 (Figs. 11 and 14) has formed thereon a protuberance 1036 which, in the cleared position of the slide, is out of engagement with the associated ball contact 1035 when the device is in the case. However, as shown at 1037, each slide which has been set to active position to indicate a number is so positioned that its protuberance 1036 contacts the associated ball 1035. The contacts 1035 (Fig. 12) are connected by separate wires to solenoids for pulling down the keys 121 in the keyboard of the machine. As shown in Figure 5, each of the keys 121 has a solenoid 1038 for operating it. It will be understood that each key in the keyboard is provided with such a solenoid and that each of these solenoids is connected to the corresponding contact 1035. The detailed construction of one of the solenoids 1038 is shown in Figure 4. The solenoid 1038 has a cylindrical steel core 1039 which has connected thereto the steam 1040 of the key, which stem is made of non-magnetic material, and the portion 1041 of the key stem having the stop pin 122 therein is secured to the lower end of the core 1039 and is also made of non-magnetic mtaerial.

A coil spring 1042 (Fig. 5) bearing against pins 1043 in the frame of the machine and against pins 1044 on the key stems serves to elevate depressed keys when they are released. It is to be understood that a depressed key is held down by the latch mechanism provided in the machine of the patent.

Referring now to the wiring diagram (Fig. 26), it will be seen that when the storing device 1000 is secured in place in the case 1011, the protuberance 1036 of a slide 1003 which has been set to active position will make contact with its associated ball contact 1035 which is connected by a wire 1045 to the associated solenoid 1038 so that if, for example, the No. 1 slide in the first order is set to active position, it will be connected to the No. 1 solenoid in the first order of the machine. The case 1011 is connected in any suitable manner to one side of the electric power supply so that, as diagrammatically illustrated in Figure 26, all the slides 1003 are connected by a line 1046 to a line 1047 that is connected to the power line 1048.

It will be recalled that when the lid is closed, the arm 1030 (Fig. 26) by means of its pawl 1031 momentarily closes the switch 1032. One side of the switch 1032 is connected by lines 1049, 1050 to power line 1048. The other side of switch 1032 is connected by line 1051 to a solenoid 1052 which is connected by a line 1053 to the power line 1054. The solenoid 1052 moves the plunger 1055 into engagement with a spring contact 1056 thereby completing a circuit from the line 1053 to the line 1057 to which each of the solenoids 1038 is connected.

The switch 1032 is momentarily closed to energize the solenoid 1052 in order to close the switch 1055, 1056 which remains closed until the plunger 1055 is withdrawn from engagement with the spring contact 1056. It will be understood that in Figure 26 only one row of key-operating solenoids 1038 and their associated contacts 1035 have been shown but that in the actual machine there will be similar rows of solenoids and contacts for each row of keys in the machine. Thus in any order where a slide 1003 has been set to active position, the circuit is completed which causes energization of the associated solenoid 1038 which operates to pull down the corresponding key in the keyboard which, as explained before, is held down by its latch mechanism. In this way an old balance stored in the storing device 1000 is transferred to the keyboard of the accounting machine, and this is accomplished automatically merely by placing the storing device 1000 in the case 1011 and closing the lid 1014.

It will be recalled that in the machine of the patent, after the operator has set up the old balance in the keyboard, he depresses the sub-total key 392 (Fig. 1) and the motor bar 66. This he now proceeds to do and upon depression of the sub-total key 392 (Fig. 13), the switch 1059 is closed. As shown in Figure 26 one side of this switch is connected by a line 1060 to the power line 1048, and the other side is connected to a line 1061. Line 1062 connected to the line 1061 is connected to a solenoid 1063 which is connected by a line 1064 to the power line 1054. When energized, the solenoid 1063 withdraws the plunger 1055 from engagement with the contact 1056 thereby opening the circuits of the key-operating solenoids 1038.

PRINTING NAME AND ADDRESS

A line 1065 connected to the line 1061 is connected to a printing solenoid 1066 which is connected to a line 1067 connected to the power line 1054 so that, upon depression of the sub-total key, the printing solenoid 1066 is energized. This is utilized to print the name and address as will now be explained. It will be recalled that the storing device 1000 (Fig. 11) has a plate 1009 on which the name and address of the depositor is embossed. When the storing device 1000 is placed in the case 1011 (Figs. 7 and 12), the name and address plate 1009 is disposed above a ribbon 1068. The details of the printing mechanism are shown in Figures 17 and 19. The ribbon 1068 is wound on a spool 1069 which can be mounted for rotation in brackets 1070 by opening the hinged cover 1071. The ribbon 1068 passes over supporting rollers 1072, 1073, 1074, 1075 to a winding spool 1076.

The impression of the plate 1009 is made by a hammer 1077, rectangular in form, secured to a plunger 1078 of non-magnetic metal attached to a core 1079 in the solenoid 1066. Suitable guides 1080 are provided for the hammer 1077. Upon energization of the solenoid 1066, the hammer 1077 is moved upwardly to impress the name and address on the paper strip 1058 as shown at 1190 (Fig. 22) and when the solenoid 1066 is de-energized, a spring 1081 restores the hammer to the position shown.

Downward movement of the hammer actuates the ribbon feed mechanism. The slide 1082 has an ear 1083 underlying the hammer 1077 and has a pin 1084 engaging the end of a lever 1085 which is urged clockwise (Fig. 19) on its pivot by a spring 1086. The pawl 1087 mounted on the arm 1085 actuates a ratchet wheel 1088 to wind the spool 1076. In this way the name and address is printed on the tape when the sub-total key is depressed.

*Clearing the storing device*

The slides 1003 in the storing device 1000 are normally locked, and the locking mechanism will now be described. Each of the slides 1003 (Figs. 2 and 8) has an upwardly projecting pin 1089 which has cooperating therewith a locking lug 1090 which is adapted to be moved laterally into engagement with one side or the other of the pin 1089 to hold the slide 1003 in one end or the other of its slot. As shown in Figure 8, a lug 1090 by engaging the pin 1089 on the slide 1008 is holding the slide in the rear end of the slot, that is, in its active position whereas the slide 1091 adjacent thereto is locked in the forward end of its slot, that is, in the inactive position. The locking lugs 1090 are formed as part of two locking plates 1092, 1093 which are mounted on the under side of the cover 1002 by pin and slot connections 1094 so that, as viewed in Figure 8, the locking plate 1092 may be moved to the left and the locking plate 1093 may be moved to the right. When this occurs all of the locking lugs 1090 are moved laterally out of engagement with their associated pins 1089 thereby unlocking all of the slides 1003. Normally the parts occupy the position shown in Figure 8 by reason of the fact that the two locking plates 1092, 1093 are drawn together by two springs, one of which is shown at 1095. The plates 1092, 1093 abut each other at their forward and rear ends. The abutting portions at the rear end are shown in Figure 8 at 1096 and 1097. Complementary apertures in these two abutting portions form a square aperture 1098.

When the storing device 1000 is seated in the case 1011, the apertures 1098 are disposed immediately above the bevelled ends 1099 (Figs. 12 and 20) of slides 1100 which are adapted to be projected upwardly through apertures 1101 (Fig. 11) to enter the apertures 1098 (Fig. 8) and cam the locking plates 1092, 1093 apart to release the slides 1003. The detailed construction of one of the slides 1100 is shown in Figure 20. The slide has two notches 1102, 1103 with which a spring-pressed ball 1104 cooperates to hold the slide in either its up or down position and the slide is connected to the collar 1105 of a plunger 1106 of non-magnetic material which is connected to the core 1107 of a double solenoid. The solenoid 1108 serves to move the slide 1100 upwardly and the solenoid 1109 moves it downwardly. It should be borne in mind that when the slides 1100 are projected upwardly, the slides 1003 in the storing device are unlocked and when the slides 1100 are moved downwardly, the slides 1003 are locked in their adjusted position. Referring to Figure 26 the line 1061 which is connected to one side of the sub-total key switch 1059 has connected thereto a line 1110 connected to one of the solenoids 1108 which is connected by a line 1111 to the line 1067. The line 1110 has connected thereto a line 1112 which is connected to the other solenoid 1108 which is connected by a line 1113 to the line 1067. Thus upon depression of the sub-total key, both solenoids 1108 are energized to move the slides 1100 upwardly to unlock the slides 1003 in the storing device.

After the slides 1003 are unlocked they are to be cleared, that is, any slide which is set to active position is now to be set to inactive position. For this purpose one of the slides 1100 (Fig. 20) has two insulated pins 1114 which operate a double-throw switch having a common contact arm 1115 engaged by the pins 1114. In the down position of the slide 1100, shown in Figure 20, switch 1116 is closed and switch 1117 is open. When as just described the slide 1100 is moved upwardly, the switch 1117 is closed and the switch 1116 is opened. These parts are shown in Figure 26 where it will be seen that the common contact arm 1115 is connected by a line 1118 to the line 1067, and the other side of the switch 1117 is connected by a line 1119 to the solenoid 1120 which operates the clearing mechanism, the operation of which will presently be described. This solenoid is also connected to the line 1061. Therefore, upon depression of the sub-total key 392, the solenoid 1120 is energized after the switch 1117 is closed.

The solenoid 1120 is shown in Figure 21 where it is mounted in the case 1011 and has a spring-returned plunger 1121 connected to a crank 1122 secured to a shaft 1123 having an arm 1124 secured thereto. There are a plurality of shafts similar to the shaft 1123, and bearing the same reference numerals, which are mounted in the case and are arranged parallel and transversely thereof (see Figure 12). Each of these shafts has an arm 1124 secured thereto, and the arms 1124 are interconnected for simultaneous movement by a link 1125. A stop 1126 (Fig. 21) cooperates with a lug 1127 on one of the arms 1124 to limit clockwise rotation of the shafts 1123. When the solenoid 1120 is energized, the shafts are rotated counterclockwise. On each of the shafts 1123 a series of setting arms 1128 are mounted, there being one of these arms in each order. As shown in Figure 14, the shafts 1123 are splined and each arm 1128 has a tooth or key 1129 engaging therein. The width of the spline exceeds the width of the key for a purpose hereinafter described. As previously described after the slides 1003 (Fig. 15) have been unlocked, the clearing mechanism operates to rotate the shafts 1123 counterclockwise (Fig. 15) moving each arm 1128 to the broken-line position, thereby moving the associated slide 1003 from its active position shown in full lines to its inactive position shown in broken lines. It will be understood that due to the simultaneous operation of all the shafts 1123 and the levers 1128 mounted thereon, any slides 1003 set in the active position will be moved to the inactive position thereby clearing the total or old balance out of the storing device. The storing device is now conditioned to receive the new balance.

TRANSFER OF NEW BALANCE TO STORING DEVICE

As already stated, the operator proceeds to post the checks and deposits in the usual manner and then depresses the balance key 292 (Fig. 1) and the motor bar 66 in order to print the new balance. I have provided mechanism which enables the operator to transfer the new balance to the storing device before printing the balance. For this purpose I have provided a new balance key 1130 which, as shown in Figure 24, is suitably supported for vertical sliding movement in brackets on the exterior of the machine and has a spring 1131 for restoring the key. Upon depression of the key 1130, a pin 1132 thereon acting on the cam face 1133 of a pawl 1134 pivoted to a slide 1135 causes the slide to be moved rearwardly. The rear end of the slide is connected to a crank arm 1136 secured to a shaft 1137 which is thereby rocked counterclockwise, or clockwise as viewed in Figure 23. Within the left side of the case of the machine, the shaft 1137 has secured thereto a latch 1138 urged counterclockwise by spring 1139. The latch 1138 engages an ear 1140 on an arm 1141 secured to a shaft 1142 which extends transversely of the machine and is suitably supported by insulated bearings in the sides thereof. The shaft 1142 has a pinion 1143 made of non-conducting material engaging a gear 1144 which has a pin 1145 engaging a slot 1146 in a plunger 1147 connected to the core of a solenoid 1148. The plunger 1147 has a washer 1149 between which and the solenoid is compressed a spring 1150 so that upon release of the arm 1141 by the latch 1138, the spring 1150 moves the plunger 1147 to the left rotating the gear 1144 clockwise and the pinion 1143 counterclockwise. The arm 1141 is one arm of a transversely extending bail 1151 which is thereby mounted for rotation with the shaft 1142. It will thus be seen that upon release of the latch 1138, the bail 1151 will rotate counterclockwise.

Referring now to Figure 6, in each order of the machine there is arranged a series of nine contacts 1152 suitably mounted on a segment of insulation 1153, and cooperating with each series of contacts 1152 is a brush 1154 carried by an arm 1155 rotatably mounted on the shaft 1142 so that upon counterclockwise movement of the bail 1151, the brush arms 1155 are free to rotate counterclockwise. The movement of each of these brush arms is controlled by the position of the totalizer gear 108 in the No. 1 totalizer as will now be described.

Each brush arm 1155 has secured thereto a pinion 1156 connected by an idler 1157 made of non-conducting material to a gear 1158 which meshes with a rack 1159 having a sensing finger 1160 integral therewith. A spring 1161 urges the finger 1160 into contact with a stepped cam 1162 which is secured for rotation with the adjacent totalizer gear 108. The spring 1161 also causes the brush arm 1155 to follow the bail 1151 until movement of the finger 1160 is stopped by engagement with a step of the cam 1162. When this occurs the brush 1154 is in contact with the contact 1152 corresponding to the number at which the totalizer gear stands.

Each of the contacts 1152 in each order is connected to the corresponding solenoid 1163 (Fig. 14) in the case 1011, there being a solenoid for each of the arms 1128 as shown in Figure 12.

Referring to Figure 14 it will be noted that the core of the solenoid 1163 is connected to a spring-urged plunger 1164 connected to an arm 1165 of the lever 1128. When one of the solenoids 1163 is energized, it rocks the arm 1128 clockwise from the broken line position shown in Figure 14 to the full line position thereby setting the associated slide 1003 to active position. The solenoids are not energized, however, until the bail 1151 reaches the end of its upward movement so that the contacts 1152 (Fig. 6) are dead during the time that the brushes 1154 are moving over them.

After all of the brush arms 1155 have been set, continued movement of the bail 1151 and its arm 1141 (Fig. 23) brings a brush 1166 on the arm 1141 into contact with the contact 1167. Now referring to the wiring diagram (Fig. 26), it will be seen that when the brush 1166 engages the contact 1167, a circuit is completed from the power line 1048 through the line 1168 to the contact 1167 through the brush 1166, the arm 1141, the shaft 1142 to the brush arms 1155 (only one of which is shown in Figure 26), hence completing a circuit through the contact 1152 on which the brush 1154 is resting through the connecting line 1169 to the appropriate solenoid 1163 which is connected to a common line 1170 connected to the power line 1054. In this way the selected solenoids 1163 are energized to rock their associated setting arms 1128 to set the new balance in the storing device. While the arms are still in their setting position shown in Figure 14, the final movement of the bail 1151 (Fig. 23) brings the brush 1171 into contact with a contact 1172, a stop 1173 limiting upward movement of the bail. The contact 1172 (see Figure 26) is connected by a line 1174 to the solenoids 1109 which serve to withdraw the slides 1100 to cause locking of the adjusted slides in the storing device. Upon downward movement of the slide 1100 which operates the switch arm 1115, switch 1117 is opened and the switch 1116 is closed. This switch is connected by a line 1176 to a solenoid 1148 which is connected through a switch 1178 to a line 1179 connected to the line 1048. The switch 1178 (Fig. 23) is normally held open by the core 1180 of the solenoid 1148. As soon as the bail 1151 is unlatched, this switch closes so that when the brush 1171 engages the contact 1172, the solenoid 1148 is energized to restore the bail 1151 by moving the plunger 1147 to the right and through the gears 1143, 1144 rotating the shaft 1142 clockwise. At the end of the downward travel, which is limited by a stop 1181, the latch 1138 engages the ear 1140 on the arm 1141 and at the same time, the core 1180 opens the switch 1178 thereby de-energizing the solenoid 1148. This occurs even though the new balance key 1130 (Fig. 24) has not been released by the operator because the pin 1132 passes beyond the pawl 1134 in its downward movement and the slide 1135, after causing unlatching of the bail, returns immediately to the right. When the operator releases the key 1130, the pin 1132 rocks the pawl 1134 without actuating slide 1135.

OPERATION

Old balance pick-up

When it is desired to post a certain account, the operator selects from a suitably indexed file the storing device 1000 (Fig. 8) for that account, places the storing device in case 1011 (Fig. 7) and closes lid 1014, which operation causes the storing device to depress pins 1026 and 1027 (Fig. 12).

Depression of pin 1026 (Fig. 18) causes momentary closure of switch 1032, thereby energizing solenoid 1052 (Fig. 26) which closes master switch 1055—1056.

When the storing device is located in the case, as described above, slides 1003 (Fig. 11) which are in operative position, that is, those slides indicating a value, are in cooperative engagement with corresponding spring-pressed balls 1035 (Fig. 12), thereby energizing associated solenoids 1038 (Fig. 26) causing keys 121 (Fig. 5) associated therewith to be depressed. Thus the value stored in the device is transferred to the machine.

The operator then depresses sub-total key 392 (Fig. 13) which closes switch 1059 (Fig. 26) causing energization of solenoid 1063 to open master switch 1055—1056, thereby de-energizing solenoids 1038. Depression of sub-total key 392 also energizes solenoid 1066 (Fig. 17) which raises print hammer 1077 causing the name and address on plate 1009 secured to the storing device to be printed on tape 1058 as shown at 1190 in Figure 22.

Depression of key 392 (Fig. 26) and closing of switch 1059 also closes the circuits to solenoids 1108 raising the slides 1100 to unlock the storing device as previously described.

Immediately after storing device 1000 is unlocked, the storing device clearing mechanism is operated in the following manner. Upward movement of pin 1100 (Fig. 26) urges leaf 1115 into contact with switch member 1117, energizing solenoid 1120 (Fig. 21) to actuate arms 1128 thereby restoring slides 1003 (Fig. 11) to inactive position.

From the foregoing it will be understood that insertion of the storing device in the machine and depression of the sub-total key 392 causes the value originally held in the storing device to be transferred to the keyboard of the machine, the name and address to be printed on the tape, and the old balance to be cleared from the storing device.

The operator then depresses the motor bar 66 (Fig. 1) which causes the "Old balance" set in the keyboard to be printed on tape 1058, as shown at 1191 in Figure 22, and to be stored in the No. 1 totalizer in the conventional manner as fully described in the above-cited Christian patent.

The operator then proceeds to post checks and deposits in the usual manner and, as described in the Christian patent, the items are printed on the tape as shown at 1192 (Fig. 22).

*New balance pick-up*

At the conclusion of such posting as is necessary, depression of the "New balance" key 1130 (Fig. 24) causes latch 1138 (Fig. 23) to release arm 1141, allowing associated bail 1151 to rotate counterclockwise. As arm 1141 rotates as described above, the core 1180 of solenoid 1148 (Fig. 23) moves laterally closing switch 1178 on one lead to solenoid 1148. The above-mentioned displacement of bail 1151 allows arms 1155 (Fig. 6) to rotate counterclockwise. Each arm 1155 rotates until its associated finger 1160 engages its stepped cam 1162, thereby adjusting the brushes 1154 in accordance with the value in the No. 1 totalizer. When arm 1141 (Fig. 26), with contacts 1166 and 1171 secured thereto, rotates so that contacts 1166 and 1167 are in engagement, a circuit is closed energizing those solenoids 1163 which are electrically connected to the above-mentioned brushes 1154, positioning the slides 1003 (Fig. 14) associated therewith to active or registering position. In this way the value standing in the No. 1 totalizer is set in the storing device.

At the end of rotation of arm 1141 (Fig. 23), while contacts 1166 and 1167 are still in engagement, contact 1171 secured to arm 1141 engages contact 1172, closing another circuit, energizing solenoids 1109 (Fig. 26) to withdraw slides 1100, thereby causing slides 1003 in storing device 1000 to be locked in their adjusted positions. Withdrawal of slide 1100 connected to leaf 1115 (Fig. 26) closes the circuit to solenoid 1148 which restores bail 1151 (Fig. 23) to its original position.

From the foregoing it will be seen that depression of the "New balance" key 1130 will cause the value in the No. 1 totalizer to be transferred to the storing device and to be locked therefrom. At the conclusion of this operation, the operator depresses balance key 292 (Fig. 1) and motor bar 66, and the machine disclosed in the above-mentioned Christian patent prints the New balance on tape 1058 as shown at 1193 in Figure 22.

After posting the account the operator removes the storing device 1000, and the storing device for the next account is placed in the case 1011.

I claim:

1. In an apparatus for controlling a bookkeeping machine, the combination with a plurality of separate magnet actuated elements of a control plate severable from said magnet actuated elements and provided with a plurality of rows of movable tabs effective for indicating the balance of an account, each row including a separate tab corresponding to each of the integers from 1 to 9, means for detachably connecting the control plate in cooperative relation to said magnet actuated elements, said magnet actuated elements being movable for actuating said movable tabs.

2. The combination with a computing machine having a totalizer, and settable means for controlling the registration of figures in said totalizer, of a storing device having means adjustable in accordance with a figure, means for sensing a figure registered in said totalizer, means for adjusting said adjustable means, and electrical means responsive to said sensing means for operating said adjusting means.

3. The combination with a computing machine having a totalizer, and settable means for controlling the registration of figures in said totalizer, of a storing device having means adjustable in accordance with a figure, means for sensing a figure registered in said totalizer, means for adjusting said adjustable means, solenoids for operating said adjusting means, and means adjusted by said sensing means for controlling energization of said solenoids.

4. The combination with a computing machine having a totalizer, and settable means for controlling the registration of figures in said totalizer, of a storing device removable from the machine for storage and having a plurality of elements adjustable in accordance with a figure, means for sensing a figure registered in said totalizer, means for adjusting said elements, including a setting member for each of said elements, a solenoid for operating each of said setting members, and means adjusted by said sensing means for controlling energization of said solenoids.

5. The combination with a computing machine having a totalizer, and settable means for controlling the registration of figures in said totalizer, of a storing device removable from the machine for storage and having means adjustable in accordance with a figure, and electrical means controlled by said adjustable means in said storing device for adjusting said settable registration control means.

6. The combination with a computing machine having a totalizer, and a plurality of settable members for controlling the registration of figures in said totalizer, of a storing device removable from the machine for storage and having means adjustable in accordance with a figure, a solenoid for setting each of said settable registration control members, and means controlled by said adjustable storing device means for energizing said solenoids.

7. The combination with a computing machine having a totalizer, and a plurality of settable members for controlling the registration of figures in said totalizer, of a solenoid for setting each of said settable registration control members, and a storing device removable from the machine for storage and having a plurality of elements adjustable in accordance with a figure, there being one of said elements for each of said solenoids, each element controlling the electrical circuit of its associated solenoid.

8. The combination with a computing machine having a totalizer, and a plurality of settable members for controlling the registration of figures in said totalizer, of a solenoid for setting each of said settable registration control members, means to provide an electrical circuit for each of said solenoids, and a storing device removable from the machine for storage and having a plurality of circuit controls, one for each of said solenoid circuits.

9. The combination with a computing machine having a totalizer, and a plurality of settable members for controlling the registration of figures in said totalizer, of a solenoid for setting each of said settable registration control members, means to provide an electrical circuit for each of said solenoids, and a plurality of storing devices removable from the machine for storage and each having a plurality of circuit controls, one for each of said solenoid circuits.

10. The combination with a computing machine having a totalizer, a plurality of settable members for controlling the registration of figures in said totalizer, a solenoid for setting each of said members, and means to provide an electrical circuit for each of said solenoids, of a storing device separable from the machine having a plurality of circuit controls, whereby when said device is in cooperative relation with said machine each of said circuit controls will control one of said solenoid circuits.

11. The combination with a computing machine having a totalizer, and means for controlling the registration of figures in said totalizer, of a figure storing device removable from the machine for storage, said storing device having means settable to represent the figure to be stored therein, said storing device having means for locking said settable means, said locking means being automatically operable upon removal of said device from the machine for storage, transfer means adapted to cooperate with said storing device, said transfer means having means responsive to said settable means in said storing device for automatically setting said registration control means to the figure set in said storing device when said storing device is disposed in cooperative relation with said transfer means, and means operable while said storing device is disposed in cooperative relation with said transfer means for causing said locking means to release said settable means in said device.

12. The combination with a computing machine having a totalizer, and means for controlling the registration of figures in said totalizer, of a figure storing device removable from the machine for storage, said storing device having means settable to represent the figure to be stored therein, said storing device having means for locking said settable means, said locking means being automatically operable upon removal of said device from the machine for storage, transfer means adapted to cooperate with said storing device, said transfer means having means responsive to said settable means in said storing device for automatically setting said registration control means to the figure set in said storing device when said storing device is disposed in cooperative relation with said transfer means, means operable while said storing device is disposed in cooperative relation with said transfer means for causing said locking means to release said settable means in said device, and means rendered operable by said lock releasing means and operable upon said settable means to clear the figure from said storing device.

13. The combination with a computing machine having a totalizer, and means for controlling the registration of figures in said totalizer, of a figure storing device removable from the machine for storage, said storing device having means settable to represent the figure to be stored therein, said storing device having means for locking said settable means, said locking means being automatically operable upon removal of said device from the machine for storage, transfer means adapted to cooperate with said storing device, said transfer means having means responsive to said settable means in said storing device for automatically setting said registration control means to the figure set in said storing device when said storing device is disposed in cooperative relation with said transfer means, manually controlled means operable while said storing device is disposed in cooperative relation with said transfer means for causing said locking means to release said settable means in said device, and means controlled by said lock releasing means for automatically operating said settable means to clear the figure from said storing device.

14. The combination with a computing machine having a totalizer, and means for controlling the registration of figures in said totalizer, including means settable in accordance with a figure and an operation control key for determining additive registration in said totalizer, of a figure storing device removable from the machine for storage, said storing device having means settable to represent the figure to be stored therein, said storing device having means for locking said settable means, said locking means being automatically operable upon removal of said device from the machine for storage, transfer means adapted to cooperate with said storing device, said transfer means having means responsive to said settable means in said storing device for automatically setting said settable means in said registration control means to the figure set in said storing device when said storing device is disposed in cooperative relation with said transfer means, means controlled by said key operable while said storing device is disposed in cooperative relation with said transfer means for causing said locking means to release said settable means in said device, and means controlled by said lock releasing means for automatically operating said settable means in said device to clear the figure from said storing device.

15. The combination with a computing machine having a totalizer, and means for controlling the registration of figures in said totalizer, including means adjustable to determine the figure to be registered, and an operation control key for determining additive registration in said totalizer, of a figure storing device removable from the machine for storage having means settable to represent the figure to be stored therein, and having means normally operable to lock said settable means, figure transfer means operable when in cooperative relation with said device to adjust said figure determining means in said registration controlling means in accordance with the setting of said settable means in said figure storing device, and means operated by said control key for releasing said locking means.

16. The combination with a computing machine having a totalizer, and means for controlling the registration of figures in said totalizer, including means adjustable to determine the figure to be registered, and an operation control key for determining additive registration in said totalizer, of a figure storing device removable from the machine for storage having means settable to represent the figure to be stored therein, and having means normally operable to lock said settable means, figure transfer means operable when in cooperative relation with said device to adjust said figure determining means in said registration controlling means in accordance with the setting of said settable means in said figure storing device, and means operated by said control key for releasing said locking means and setting said settable means to clear the figure from said storing device.

17. In combination, a machine having means for performing computations, means for printing the figures of each computation, and means for printing characters to identify a computation, a device normally removed from the machine, said device having means for storing a figure, said device having characters thereon identifying the figure stored therein, said characters cooperating with said character printing means when said device is in the machine and means for transferring to said storing means the result of a computation performed while said device is in the machine.

18. In combination, a machine having means for performing computations, including a register and registration control means for determining the figure to be entered in said register, means for printing the figures of each computation, and means for printing characters to identify a computation, a device normally removed from the machine, said device having means for storing a figure, said device having characters thereon identifying the figure stored therein, said characters cooperating with said character printing means when said device is in the machine, means to transfer the figure stored in said device to said registration control means at the beginning of the computation and means for transferring the figure in said register at the conclusion of the computation to said storing means.

19. In combination, a machine having a totalizer, registration control means settable to determine the figure to be entered in said totalizer, means for printing figures entered in said totalizer, for printing the total of said figures, and for printing characters to identify the total and the figures which produced said total, and a device normally removed from the machine having characters thereon which said printing means prints to identify figures printed when said device is in the machine.

20. In combination, a machine having a totalizer, registration control means settable to determine the figure to be entered in said totalizer, means for printing the figures entered in said totalizer, for printing the total of said figures, and for printing characters to identify the total and the figures which produced said total, a device normally removed from the machine having characters thereon which said printing means prints to identify the figures printed when said device is in the machine, said device having means adjustable to represent a figure, and means controlled by said totalizer for adjusting said adjustable means to the total figure produced while said device is in the machine.

21. In combination, a machine having a totalizer, registration control means settable to determine the figure to be entered in said totalizer, means for printing figures entered in said totalizer, for printing the total of said figures, and for printing characters to identify the total and the figures which produced said total, a device normally removed from the machine having characters thereon which said printing means prints to identify the figures printed when said device is in the machine, said device having means adjustable to represent a figure, means controlled by said totalizer for adjusting said adjustable means to the total figure produced while said device is in the machine, and means in said device to lock said adjustable means while said device is removed from the machine.

22. In combination, a machine having a totalizer, registration control means settable to determine the figure to be entered in said totalizer, means for printing figures entered in said totalizer, for printing the total of said figures, and for printing characters to identify the total and the figures which produced said total, a device normally removed from the machine having characters thereon which said printing means prints to identify the figures printed when said device is in the machine, said device having means adjustable to represent a figure, means controlled by said totalizer for adjusting said adjustable means to the total figure produced while said device is in the machine, means in said device to lock said adjustable means while said device is removed from the machine, and means controlled by said adjustable means when said device is replaced in the machine for setting said registration control means to the total figure stored in said device.

23. In combination, a machine having a totalizer, registration control means settable to determine the figure to be entered in said totalizer, means for printing figures entered in said totalizer, for printing the total of said figures, and for printing characters to identify the total and the figures which produced said total, a device normally removed from the machine having characters thereon which said printing means prints to identify the figures printed when said device is in the machine, said device having means adjustable to represent a figure, means in said device to lock said adjustable means while said device is removed from the machine, and means controlled by said adjustable means when said device is placed in the machine for setting said registration control means to the figure stored in said device.

24. In combination with a computing machine having means for printing the figures of computations on a tape, a plurality of identified figure-storing devices normally removed from the machine each having a plurality of digit-representing elements arranged in ordinal and numerical rows, each element being mounted in said device for movement out of line with its numerical row, the out-of-line elements serving to represent the figure stored in said device, each of said devices having a stamp for printing a name identifying the figure stored therein, means in said machine to position any one of said devices with its stamp over said tape, and means in said machine to make an imprint of said stamp on said tape, thereby printing the identifying name adjacent the figures printed while said device is in the machine.

25. In combination with a computing machine having a totalizer, registration control means for determining the figure to be entered in said totalizer, means for printing the figures of computations on a tape, a plurality of identified figure-storing devices normally removed from the machine each having means adjusted to represent the stored figure, each of said devices having a stamp for printing a name identifying the figure stored therein, means in said machine to position any one of said devices with its stamp over said tape, means in said machine to make an imprint of said stamp on said tape, thereby printing the identifying name adjacent the figures printed while said device is in the machine, and means controlled by said adjusted means in said device when said device is in the machine for setting said registration control means in accordance with the figure stored in said device.

GEORGE W. ALLAN.

REFERENCES CITED

The following references are of record in the file of this patent:

UNITED STATES PATENTS

| Number | Name | Date |
|---|---|---|
| Re. 21,208 | Gollwitzer | Sept. 19, 1939 |
| 604,977 | Frydmane | May 31, 1898 |
| 1,036,565 | Church | Aug. 27, 1912 |
| 1,118,185 | Church | Nov. 24, 1914 |
| 1,136,101 | Church | Apr. 20, 1915 |
| 1,169,773 | Church | Feb. 1, 1916 |
| 1,182,975 | Church | May 16, 1916 |
| 1,205,298 | Werner | Nov. 21, 1916 |
| 1,206,813 | Church | Dec. 5, 1916 |
| 1,414,978 | Bumstead | May 2, 1922 |
| 1,593,599 | Robertson | July 27, 1926 |
| 1,637,080 | Kesses | July 26, 1927 |
| 1,761,684 | Robertson | June 3, 1930 |
| 1,963,346 | Baker | June 19, 1934 |
| 2,131,503 | Elliott | Sept. 27, 1938 |
| 2,132,411 | Gollwitzer | Oct. 11, 1938 |
| 2,244,231 | Armbruster | June 3, 1941 |
| 2,254,931 | Bryce | Sept. 2, 1941 |
| 2,357,455 | Bryce | Sept. 5, 1944 |
| 2,367,395 | Gollwitzer | Jan. 16, 1945 |
| 2,369,430 | Brand et al. | Feb. 13, 1945 |